July 22, 1930.  J. H. KRONBERG  1,771,338
AUTO SIGNAL SWITCH
Filed July 5, 1927    3 Sheets-Sheet 1
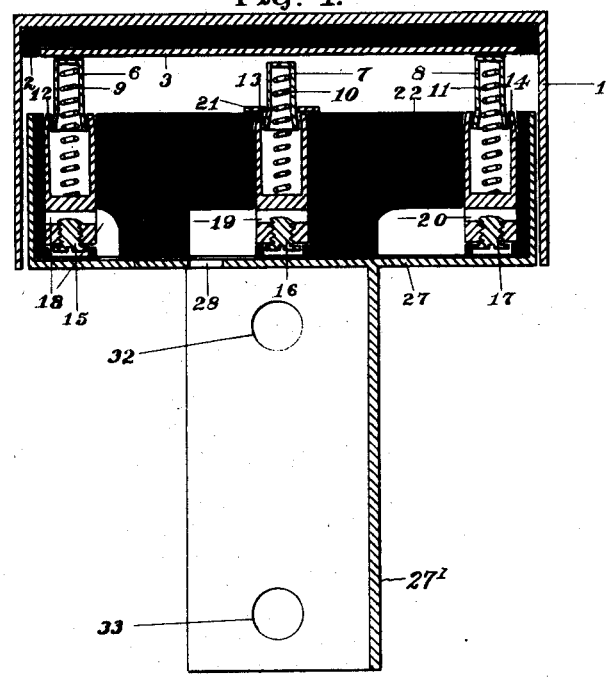
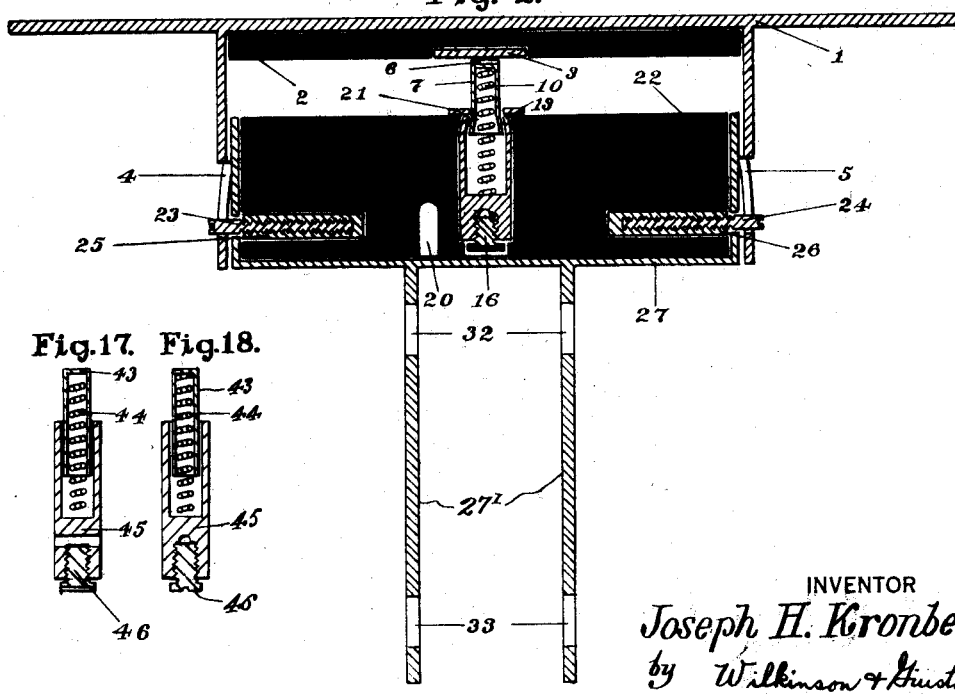
INVENTOR
Joseph H. Kronberg
by Wilkinson & Giusta
ATTORNEYS.

July 22, 1930.                J. H. KRONBERG                1,771,338
                              AUTO SIGNAL SWITCH
                          Filed July 5, 1927         3 Sheets-Sheet 2
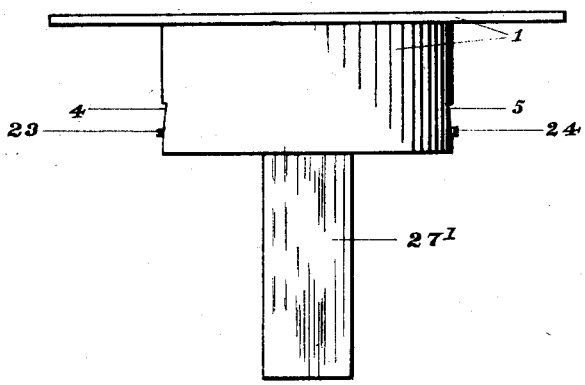
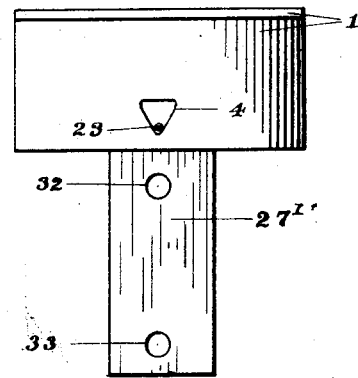
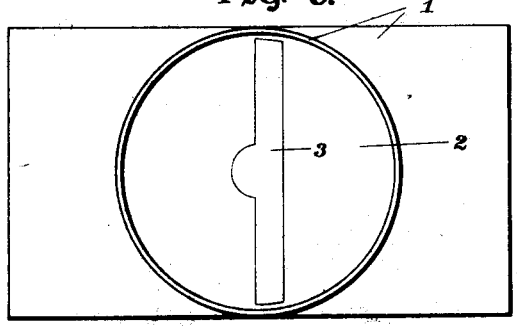
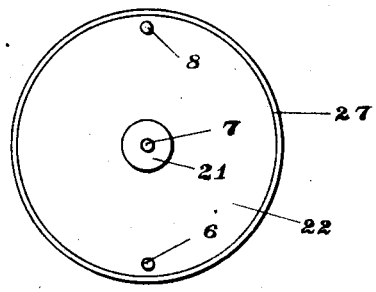
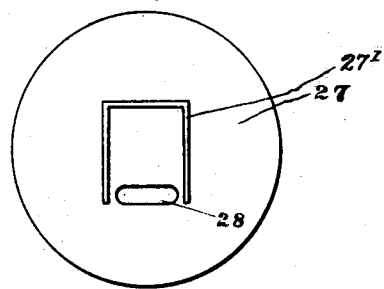
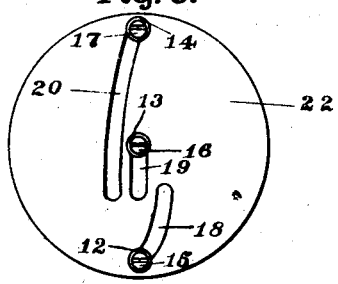
INVENTOR
Joseph H. Kronberg
by Wilkinson & Huota
ATTORNEYS.

Patented July 22, 1930

1,771,338

UNITED STATES PATENT OFFICE

JOSEPH HERBERT KRONBERG, OF GREAT FALLS, MONTANA

AUTO SIGNAL SWITCH

Application filed July 5, 1927. Serial No. 203,582.

The present invention relates to improvements in automobile signals, and has for an object to provide a signal, in association with the foot brake, whereby warning may be automatically given when the brakes are applied, and whereby further the intention to turn to the right or the left may be announced.

Another object of the invention is to provide an improved automobile signal in which signal lights or other signaling devices may be employed to give warning of intended stoppage, proposed change in direction or other maneuvers of the vehicle; and wherein the mechanism is contained within small compass, is light and inexpensive, and of such nature as to constitute an accessory capable of being applied to existing constructions without involving alteration.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical sectional view taken through the improved switch pedal construction;

Figure 2 is a substantially horizontal view, taken at approximate right angles to Figure 1;

Figure 3 is a top edge view of the pedal construction;

Figure 4 is a side view thereof;

Figure 5 is a bottom plan view of the tread and its cup member showing the contact bar;

Figure 6 is an interior plan view of the lower cup member of the switch;

Figure 7 is a bottom plan view of the lower cup member;

Figure 8 is a bottom plan view of the insulating block of the lower cup member showing the channels for the lead wires;

Figure 9 is a top plan view of the pedal switch, with parts broken away showing the neutral position;

Figure 10 is a similar view with the pedal canted to indicate a right turn;

Figure 11 shows the canted position of the pedal in the opposite direction to indicate a left turn;

Figure 12 shows a side view of the pedal switch in the position corresponding to Figure 10;

Figure 13 is a similar view with the pedal corresponding in position to Figure 11;

Figure 14 shows a side view of the pedal switch coupled to the brake mechanism;

Figure 15 is a view in elevation of the same;

Figure 16 shows the circuit diagram employed;

Figure 17 is a longitudinal section through a modified type of plunger and spring housing contact; and Figure 18 is a similar view taken at approximate right angles to Figure 17.

Referring more particularly to the drawings, 1 designates a pedal and its cup containing therewithin the insulation 2, in which is embedded the metallic contact bar 3. The pedal cup is adapted to telescope a second cup 27 containing the insulating block 22.

The inner cup 27 is carried by the brake lever 38, shown in Figures 14 and 15 which is connected to the brake shaft 42. The bolts 34 and 35 are adapted to hold the bracket 27' upon the brake lever 38. The bracket 27' as shown in Figures 1 and 2 is provided with the perforations 32 and 33 to receive the bolts 34 and 35. In Figure 14 such bolts are shown as provided with nuts 36 and 37.

In Figures 1 and 2, the contact plate 3 is shown as adapted to be engaged by the contacts 6, 7 and 8. These contacts are preferably inverted cup shaped metallic members arranged to be projected yieldably upward toward the contact plate 3 by coil springs 9, 10 and 11. The cups are preferably flared outwardly at their lower ends to form stops with the correspondingly flared upper ends of the sockets 12, 13 and 14, in which the contacts slidingly and telescopically fit. The flared portions restrict the upper movement of the contacts. The central contact 7 is shorter than the end contact 6 and 8 whereby to be normally out of engagement with the contact bar 3.

Contact screws or binding posts are indicated at 15, 16 and 17 in the lower portion of the socket members, which socket members are embedded in the insulation 22. The lead wires are let in through the channels 18, 19 and 20 made in the lower portion of the insulating body 22, a bottom plan of which is shown in Figure 8. It will be seen in Figure 8 that the proximate ends of the channels 18, 19 and 20 overlap close to one another so as to be spanned in common by the elongated slot 28, shown in Figures 1 and 7, in the bottom of the inner cup 27. It is through this elongated slot 28 that the lead wires 39, 40 and 41, shown in Figures 14 and 15, are introduced into the switch pedal.

At 21 is shown a washer or thrust plate extending about the central shorter contact member 7, to be engaged by the contact plate 3 in the lowermost position of the pedal.

Stop screws or stop members 23 and 24, are shown in Figure 2, as being removably engaged within sockets 25 and 26 embedded in the insulation 22. These stop screws project outwardly from the end portions of the inner cup 27 and into triangular slots 4 and 5 in the adjacent walls of the outer cup member 1.

In Figures 17 and 18 are shown cup contacts 43 held yieldably in the raised position by coil springs 44 mounted in the sockets 45 having the screws or binding posts 46. In this instance, no cooperating flaring portions are shown. The cups may be quickly detached when the pedal cups are separated.

Referring to Figure 16, the wires 39, 40 and 41 are shown as being connected at one end to ground and at the other ends respectively to the contacts 6, 7 and 8. A battery or other source of current is shown at 51.

Front lights or signal devices of any kind are indicated at 47 and 48 while rear lights are indicated at 49 and 50. The front lights 47 and 48 may be mounted in the position now generally occupied by cowl lamps while the rear lights 49 and 50 are mounted upon the rear portion of the vehicle at the left and right side thereof so as to be observable from the rear.

The lights 47 and 49 upon one side are included in series in the circuit 39; while the lights 48 and 50 upon the opposite side of the vehicle are included in series in the opposite circuit 41.

In operation, the pedal normally occupies the central neutral position indicated in Figure 9. When the pressure of the foot is relieved from the pedal, the coil springs 9 and 11 will force the outer cup 1 backwardly so that the contact plate 3 is removed from engagement with the center contact 7, as shown in Figure 1. The current from the battery 51 is thus interrupted. By depressing the pedal 1 with the foot, the contact plate 3 carried thereby is advanced into engagement with the center contact 7. The circuits 39 and 41 which are in relatively parallel arrangement, are simultaneously closed so that all four lamps are illuminated. Attention is thus called both from the front and rear to the fact that the brakes are about to be applied or have been applied and a warning is given to pedestrians and oncoming vehicles.

In case the driver desires to negotiate a turn to the right into an intersecting street, he will first shift the pedal 1 to the position, shown in Figure 10, thereby moving the contact bar 3 through an angular distance sufficient to open the circuit at the contact 6, though leaving the circuit at the contact 8 still closed. The lamps 48 and 50 will thus remain illuminated. The lamps 47 and 49 on the left side of the vehicle will, however, become dark thus showing the intended right hand turn.

By angularly shifting the pedal 1 in the opposite direction, as shown in Figure 11, the circuit is interrupted at the contact 8 and left closed at the contact 6 thus illuminating the left vehicle lamps 47 and 49 and extinguishing the right lamps 48 and 50. The left turn is thus announced.

This partial rotation or angular movement is permitted to the outer cup pedal 1 by virtue of the triangular slots 4 and 5 which cooperate with the stop pins 23 and 24. Normally these pins occupy the crotches of the triangular openings or slots 4 and 5 as shown in Figure 14, the coil springs 9 and 11 holding the parts in this position until pressure is applied by the foot. When such pressure is applied the slots move forwardly upon the stop pins so that the pins occupy the wider portions of the triangular slots thus permitting of the angular rotation of the cup member 1. Figure 12 shows the pin 24 occupying one upper corner slot, corresponding to the position of the pedal shown in Figure 10; while 13 shows the pin 24 occupying the opposite upper slot corner, this position of the pedal corresponding to that shown in Figure 11.

It will be noted in connection with Figures 9, 10 and 11, that the contact bar 3 is wide with reference to the diameters of the contact buttons or cups 6 and 8 and that in the diametric position shown in Figure 9, the bar 3 engages the pins 6 and 8 near the right hand edge so that a minimum of angular movement will suffice to move the contact bar off either button in accordance with the direction of the rotation.

Various other signals may be given by the device. For instance, by depressing and releasing the pedal rapidly a number of times, the lights may be made to flicker to put others upon warning or only the lights at one or the other side of the vehicle may be made to flicker to warn those at that side. All four lights may be flickered for instance when the driver is about to emerge from a parked position at the curb out into the stream of traffic. Various other combinations of signals may be given. The front lamps act as tell tales to indicate the working condition of the rear lamps.

The reason that a spring contact was placed in contact 7 was to bring all four signals into action with a slight pressure of the foot on the pedal 1. These four signals must burn until either contact point 6 or 8 slide off of plate 3, which does not take place until the three springs 9, 10 and 11 are compressed. When the brake pedal 1 is released from the extreme right or left position, guide screws 23 and 24 sliding along the edge of slot 4 and 5 will bring the contact plate 3 in contact with all three contact points for an instant, again producing four lights, before the contact between contact 7 and contact plate 3 is broken. This is a warning to the traffic that the brake has been released. If the pedal is set to turn to the right, and all springs compressed and the driver turns the pedal to the extreme left, all four signals will come into action on the neutral line Fig. 9, as the pedal is being turned, thus a warning to the traffic of an unexpected move. It is impossible when closing the switch, to show or produce either right or left signal without first showing four.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. An improved switch comprising an inner cup, a block of insulation fitted in the cup, stop pins projecting from opposite sides of the cup, yieldably pressed end contacts mounted in said block, a shorter central yieldable contact mounted in the block, an outer cup slidably fitting over the inner cup and having a tread plate on its closed end and triangular slots, in its opposite sides receiving said pins to limit the turning and axial movements of the outer cup, insulation in said outer cup, a contact bar in the insulation adapted in one position of the outer cup to engage all three contacts to one side of the longitudinal center of the bar, said outer cup adapted to be turned to shift the bar off either contact and to be axially moved to engage and disengage the bar and shorter contact.

2. An improved switch mechanism for vehicle signal circuits adapted to be attached to the clutch operating member comprising an inner cup having means to attach it to the clutch operating member, a block of insulation seated in said cup, pins projecting from opposite sides of said cup, a pair of yieldably projected contacts seated in said block, a third shorter centrally located contact also seated in the block, said contacts being included in the signal circuits, an outer cup telescoping the inner cup and having a tread plate on its upper end and triangular slots in opposite sides to receive said pins and limit depressing and turning movements of the outer cup, insulation in said outer cup, and a contact bar embedded in said insulation and adapted to engage said contacts by depression of the outer cup, said outer cup being shiftable axially toward and from the inner cup and also being angularly adjustable with respect to the inner cup for simultaneously and selectively closing the shorter contact with said first contacts.

JOSEPH HERBERT KRONBERG.